United States Patent
Glugla et al.

(10) Patent No.: US 9,879,627 B2
(45) Date of Patent: *Jan. 30, 2018

(54) METHOD AND SYSTEM FOR ENGINE AIR CONTROL (71) Applicant: Ford Global Technologies, LLC, Dearborn, MI (US)

(72) Inventors: Chris Paul Glugla, Macomb, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

This patent is subject to a terminal disclaimer.

(21) Appl. No.: 14/968,329

(22) Filed: Dec. 14, 2015

(65) Prior Publication Data
US 2016/0097334 A1 Apr. 7, 2016

Related U.S. Application Data

(63) Continuation of application No. 13/419,102, filed on Mar. 13, 2012, now Pat. No. 9,217,382.

(51) Int. Cl.
*F01L 1/34* (2006.01)
*F02D 41/00* (2006.01)
(Continued)

(52) U.S. Cl.
CPC ..... *F02D 41/0085* (2013.01); *F02D 13/0219* (2013.01); *F02D 23/00* (2013.01); *F02D 41/0002* (2013.01); *F02D 41/0097* (2013.01); *F02D 41/08* (2013.01); *F02D 41/1498* (2013.01); *F02D 41/16* (2013.01); *F01L 13/0063* (2013.01); *F02B 2075/125* (2013.01); *F02D 2041/001* (2013.01);
(Continued)

(58) Field of Classification Search
CPC .. F02D 23/00; F02D 13/0203; F02D 13/0207; F02D 13/0215; F02D 13/0219; F02D 41/16; F02D 41/08; F02D 2041/001; Y02T 10/18; F01L 9/02; F01L 9/021; F01L 9/023; F01L 9/025; F02B 33/00
USPC ......... 123/90.11, 90.12, 90.15, 90.16, 90.17, 123/559.1, 339.1
See application file for complete search history.

(56) References Cited

U.S. PATENT DOCUMENTS 3,638,624 A   2/1972   O'Grady
6,405,694 B2  6/2002   Sato
(Continued)

FOREIGN PATENT DOCUMENTS

JP   2006138292 A   6/2006

OTHER PUBLICATIONS

Partial Translation of Office Action of Chinese Application No. 2013100799946, dated Jun. 3, 2016, State Intellectual Property Office of PRC, 9 pages.

*Primary Examiner* — Hai Huynh
*Assistant Examiner* — Gonzalo Laguarda
(74) *Attorney, Agent, or Firm* — Julia Voutyras; McCoy Russell LLP (57) ABSTRACT

Methods and systems are provided for reducing idling torque imbalances between cylinders by actuating a common camshaft to which the cylinders are coupled. The camshaft may be adjusted within camshaft limits during each combustion event of each cylinder. In this way, idling NVH issues may be addressed.

19 Claims, 6 Drawing Sheets

(51) Int. Cl.

| | | |
|---|---|---|
| F02D 41/08 | (2006.01) | |
| F02D 41/14 | (2006.01) | |
| F02D 41/16 | (2006.01) | |
| F02D 13/02 | (2006.01) | |
| F02D 23/00 | (2006.01) | |
| F01L 13/00 | (2006.01) | |
| F02B 75/12 | (2006.01) | |

(52) U.S. Cl.
CPC .............. *Y02T 10/123* (2013.01); *Y02T 10/18* (2013.01); *Y02T 10/42* (2013.01)

(56) References Cited

U.S. PATENT DOCUMENTS

| | | |
|---|---|---|
| 6,478,000 B2 | 11/2002 | Ishii et al. |
| 6,907,852 B2 | 6/2005 | Schleusener et al. |
| 6,959,674 B2 | 11/2005 | Fischer |
| 7,418,935 B2 | 9/2008 | Flierl et al. |
| 7,814,875 B2 | 10/2010 | Flierl et al. |
| 7,874,272 B2 | 1/2011 | Schnell et al. |
| 8,578,898 B1 * | 11/2013 | Braman .................. F01L 1/185 123/90.16 |
| 2007/0056533 A1 | 3/2007 | Reed et al. |
| 2007/0163547 A1 | 7/2007 | Nakasaka |
| 2009/0320779 A1 | 12/2009 | Tateno et al. |
| 2010/0300386 A1 | 12/2010 | Asami et al. |
| 2012/0222513 A1 * | 9/2012 | Sakurai .................. F01L 1/352 74/397 |

* cited by examiner

METHOD AND SYSTEM FOR ENGINE AIR CONTROL

CROSS REFERENCE TO RELATED APPLICATION

The present application is a continuation of U.S. patent application Ser. No. 13/419,102, entitled "METHOD AND SYSTEM FOR ENGINE AIR CONTROL," filed on Mar. 13, 2012, the entire contents of which are hereby incorporated by reference for all purposes.

FIELD

The present application relates to methods and systems for controlling an engine operation.

BACKGROUND AND SUMMARY

At idle speed conditions, engine combustion may have substantial variation. The variation in combustion may be due to various factors including differences in fueling, charge preparation, charge distribution, and exhaust residuals between cylinders. The variation in combustion leads to variation in cylinder pressure (e.g., cylinder IMEP) as well as cylinder torque output. The torque variations may then be transmitted to the engine mounting system leading to vibration transmission and related NVH issues. At certain frequencies, the vibration may be objectionable to the vehicle operator.

One approach to address the engine idling cylinder torque variation is shown by Nakasaka in US 2007/0163547. Therein, variation in intake air amount between cylinders is determined and a variable valve device is adjusted accordingly. Specifically, an operating angle and lift amount of the variable valve device is adjusted for each cylinder until the variations are within a permissible range.

However the inventors herein have identified a potential issue with such an approach. As an example, in engines configured with a common actuator for actuating the valves of multiple cylinders (e.g., cam based valve actuators), a change in position of the common actuator will change the valve timing of all cylinders coupled to that actuator. In addition, the same change (amount, degree, and directionality) will be effected on each cylinder. However, an actuator position that improves torque variations in a first cylinder that is coupled to the common actuator may aggravate torque variations in one or more other cylinders coupled to the actuator. Consequently, even with the valve timing adjustment, torque variations and related NVH issues may persist. Overall, engine performance may be degraded.

Thus, in one example, some of the above issues may be at least partly addressed by a method for adjusting valve timing of an engine. The method may comprise, operating intake and/or exhaust valves of two or more cylinders via a camshaft, and adjusting the camshaft during engine idle conditions for each combustion event of the two or more cylinders. In this way, a common actuator may be adjusted to compensate for cylinder-to-cylinder torque variations.

In one example, each of a first and a second cylinder on a common engine bank may be coupled to a common camshaft. The first and second cylinders may have a torque variation between them based on cylinder-to-cylinder imbalances in exhaust residuals, intake air charge, fueling, dilution, etc., between cylinders. A controller may estimate the torque variation and accordingly determine a first camshaft adjustment including a first camshaft position for when the first cylinder fires, and a second, different camshaft position for when the second cylinder fires in any given engine cycle. The camshaft adjustments may enable the torque variations between the two cylinders to be reduced. The controller may further determine camshaft adjustment limits (e.g., physical limits beyond which a position of the camshaft cannot be further adjusted) based on the current engine speed as well as the firing order of the two cylinders displaying torque variation. If the desired first camshaft adjustment is within the determined limit, then during engine idling, the controller may shift the camshaft to the first and second positions during the firing of the first and second cylinders, respectively. Herein, the first and second positions may be sufficiently separated so that the camshaft can switch between the positions at the appropriate combustion events. In this way, the torque variation may be addressed using only cam adjustments and while maintaining spark timing at MBT.

However, if the desired camshaft adjustment is outside the determined limit, then it may not be physically possible for the camshaft to switch between the positions in the allotted time. Thus, to address the torque variations, during engine idling, the controller may perform a second, different camshaft adjustment wherein the camshaft is shifted to a third position for when the first cylinder fires and a fourth, different position for when the second cylinder fires. Herein, the third and fourth positions may have a smaller separation and may not, by themselves, be able to address the torque variation. Thus, in addition to the camshaft adjustment, spark timing may be adjusted (e.g., retarded) to compensate for remaining torque imbalance of the firing cylinder.

In this way, a common actuator may be used to vary the valve timing of two or more cylinders and address cylinder-to-cylinder torque variations. By addressing the torque imbalance using camshaft adjustments, an amount of spark retard required to address the torque imbalance may be reduced, thereby improving fuel economy. By reducing torque variations arising during engine idling conditions, NVH issues may be reduced and engine performance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
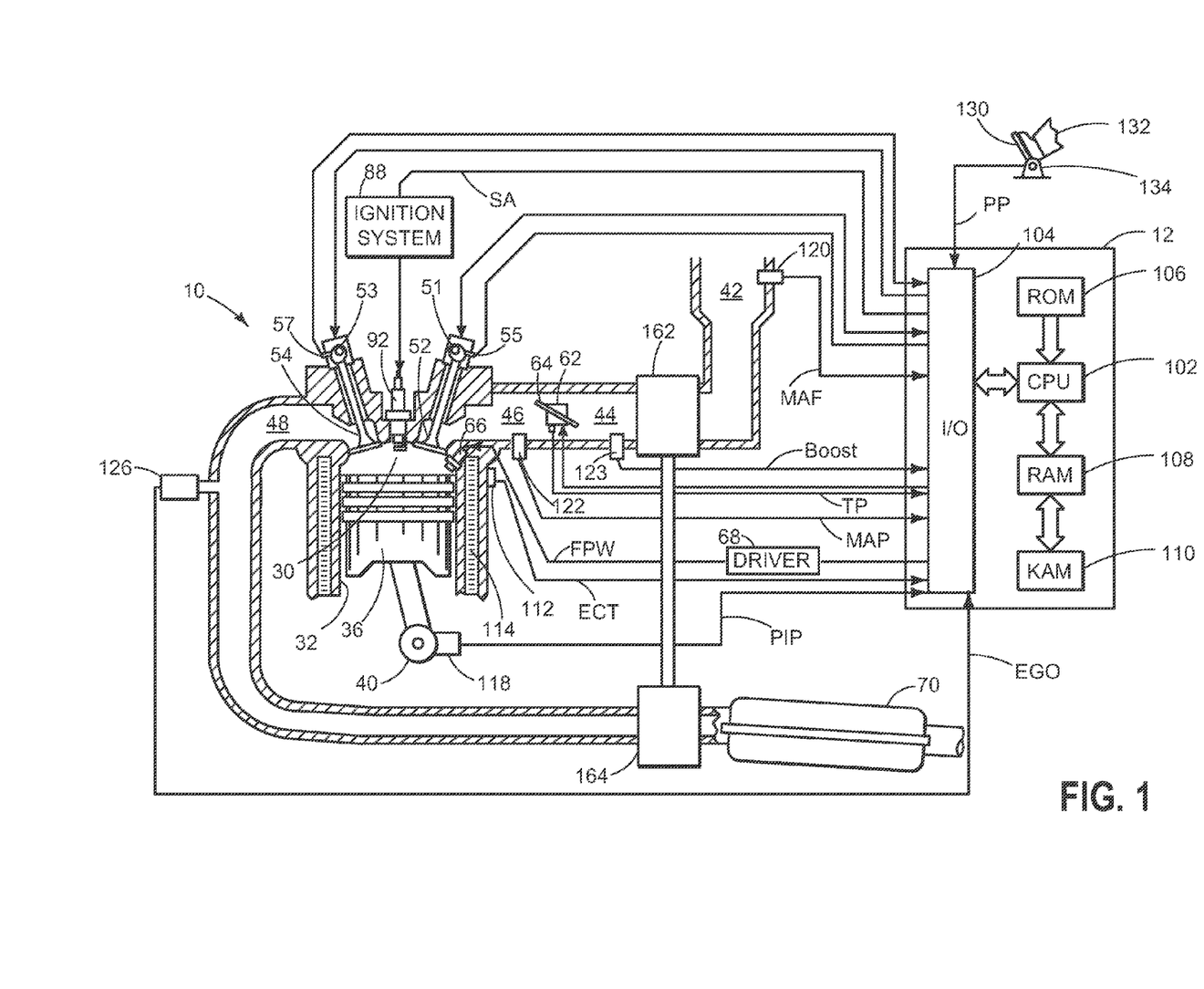
FIG. 1 shows an example engine system layout.
Figure 2:
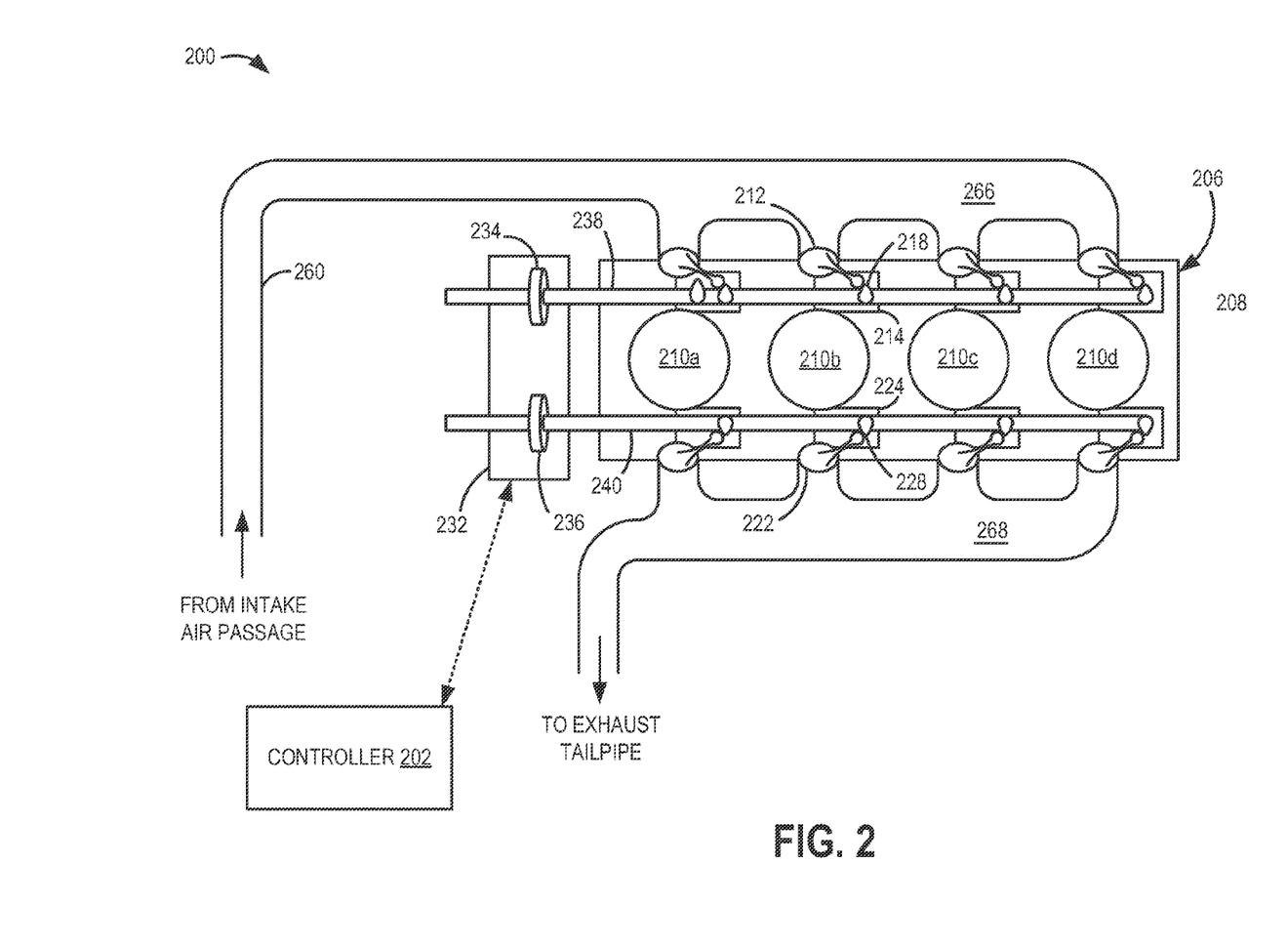
FIG. 2 shows an example coupling of two or more cylinders to a common camshaft.

Methods and systems are provided for adjusting a valve timing of multiple engine cylinders (such as in the engine of FIG. 1) by operating a common actuator (such as the camshaft of FIG. 2). The position of a camshaft may be adjusted during engine idling conditions on a cylinder-by-cylinder basis, to reduce torque variations between the cylinders coupled to the camshaft. In particular, during any given engine cycle, the camshaft may be shifted to a first position when a first cylinder coupled to the camshaft fires, and then to a second position when a second cylinder coupled to the camshaft fires, and so on. A controller may be configured to perform a control routine, such as the example routine of FIG. 3, to adjust a position of the camshaft within camshaft limits to address torque imbalances between the cylinders. If the adjustment is not sufficient to address the torque imbalance (e.g., the adjustment is physically limited), the controller may use additional spark timing adjustments to reduce torque variations. Example adjustments are shown at FIGS. 4A-4C. In this way, cylinder torque imbalances and engine idling NVH issues may be addressed using a common actuator.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 46 via intake passage 42 and may exhaust combustion gases via exhaust passage 48. Intake manifold 46 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The cam actuation system used to vary valve operation is further elaborated at FIG. 2. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 46 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold absolute pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along compressor passage 44, which may include a boost sensor 123 for measuring air pressure. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Further, in the disclosed embodiments, an exhaust gas recirculation (EGR) system (not shown) may route a desired portion of exhaust gas from exhaust passage 48 to boost passage 44 and/or intake passage 42 via an EGR passage. The amount of EGR provided to boost passage 44 and/or intake passage 42 may be varied by controller 12 via an EGR valve. Further, an EGR sensor may be arranged within the EGR passage and may provide an indication of one or more pressure, temperature, and concentration of the exhaust gas.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and manifold absolute pressure signal (MAP) from sensor 122. Engine speed signal (RPM) may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During some conditions, the MAP sensor can give an indication of engine torque. Further, this sensor, along with the detected engine speed and other signals, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and each cylinder may similarly include its own set of intake/exhaust valves, fuel injector, spark plug, etc. However, some or all of the cylinders may share some components such as camshafts for controlling valve operation. In this manner, a common camshaft may be used to control valve operation for two or more cylinders.

FIG. 2 shows an example embodiment of an engine 200 including a controller 202, a variable cam timing (VCT) system 232, and an engine block 206 with a plurality of cylinders 210. Engine 200 may be one example of engine 10 described in FIG. 1. Engine 200 is shown having an intake manifold 266 configured to supply intake air and/or fuel to the cylinders 210a-d and an exhaust manifold 268 configured to exhaust the combustion products from the cylinders 210. Ambient air flow can enter the intake system through intake air passage 260, wherein the flow rate of the intake air can be controlled at least in part by a main throttle (not shown).

Engine block 206 includes a plurality of cylinders 210a-d (herein four). In the depicted example, all the cylinders are on a common engine bank. In alternate embodiments, the cylinders may be divided between a plurality of banks. For example, cylinders 210a-b may be on a first bank while cylinder 210c-d may be on a second bank. Cylinders 210a-d may each include a spark plug and a fuel injector for delivering fuel directly to the combustion chamber, as described above in FIG. 1. Also, cylinders 210a-d may each be serviced by one or more valves. In the present example, each cylinder 210a-d includes a corresponding intake valve 212 and an exhaust valve 222. As elaborated below, engine 200 further includes one or more camshafts 238, 240 wherein each camshaft can be actuated to operate intake and/or exhaust valves of a plurality of cylinders coupled to a common camshaft.

Each intake valve 212 is actuatable between an open position that allows intake air into the corresponding cylinder and a closed position substantially blocking intake air from the cylinder. Further, FIG. 2 shows how intake valves 212 of cylinders 210a-d may be actuated by a common intake camshaft 238. Intake camshaft 238 may be included in intake valve actuation system 214. Intake camshaft 238 includes intake cams 216 which have a cam lobe profile for opening the intake valves 212 for a defined intake duration. In some embodiments (not shown), the camshaft may include additional intake cams with an alternate cam lobe profile that allows the intake valves 212 to be opened for an alternate duration (herein also referred to as a cam profile switching system). Based on the lobe profile of the additional cam, the alternate duration may be longer or shorter than the defined intake duration of intake cam 216. The lobe profile may affect cam lift height, cam duration, and/or cam timing. A controller may be able to switch the intake valve duration by moving the intake camshaft 238 longitudinally and switching between cam profiles.

In the same manner, each exhaust valve 222 is actuatable between an open position allowing exhaust gas out of the corresponding cylinder and a closed position substantially retaining gas within the cylinder. Further, FIG. 2 shows how exhaust valves 222 of cylinders 210a-d may be actuated by a common exhaust camshaft 240. Exhaust camshaft 240 may be included in exhaust valve actuation system 224. Exhaust camshaft 240 includes exhaust cams 226 which have a cam lobe profile for opening the exhaust valves 222 for a defined exhaust duration. In some embodiments (not shown), the camshaft may include additional exhaust cams with an alternate cam lobe profile that allows the exhaust valves 222 to be opened for an alternate duration. Based on the lobe profile of the additional cam, the alternate duration may be longer or shorter than the defined exhaust duration of exhaust cam 226. The lobe profile may affect cam lift height, cam duration, and/or cam timing. A controller may be able to switch the exhaust valve duration by moving the exhaust camshaft 240 longitudinally and switching between cam profiles.

It will be appreciated that while the depicted example shows common intake camshaft 238 coupled to the intake valves of each cylinder 210a-d, and common exhaust camshaft 240 coupled to the exhaust valves of each cylinder 201a-d, in alternate embodiments, the camshafts may be coupled to cylinder subsets, and multiple intake and/or exhaust camshafts may be present. For example, a first intake camshaft may be coupled to the intake valves of a first subset of cylinders (e.g., coupled to cylinders 210a-b) while a second intake camshaft may be coupled to the intake valves of a second subset of cylinders (e.g., coupled to cylinders 210c-d). Likewise, a first exhaust camshaft may be coupled to the exhaust valves of a first subset of cylinders (e.g., coupled to cylinders 210a-b) while a second exhaust camshaft may be coupled to the exhaust valves of a second subset of cylinders (e.g., coupled to cylinders 210c-d). Further still, one or more intake valves and exhaust valves may be coupled to each camshaft. The subset of cylinders coupled to the camshaft may be based on their position along the engine block 206, their firing order, the engine configuration, etc.

Intake valve actuation system 214 and exhaust valve actuation system 224 may further include push rods, rocker arms, tappets, etc. Such devices and features may control actuation of the intake valves 212 and the exhaust valves 222 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 210a-d may each have more than one exhaust valve and/or intake valve.

In still other examples, each of the exhaust valve 222 and intake valve 212 of one or more cylinders may be actuated by a common camshaft. Further still, in some examples, some of the intake valves 212 and/or exhaust valves 222 may be actuated by their own independent camshaft or other device.

Engine 200 may include variable valve timing systems, for example, variable cam timing VCT system 232. A variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds).

VCT system 232 may be a twin independent variable camshaft timing system, for changing intake valve timing and exhaust valve timing independently of each other. VCT system 232 includes intake camshaft phaser 234 coupled to the common intake camshaft 238 for changing intake valve timing and exhaust camshaft phaser 236 coupled to common exhaust camshaft 240 for changing exhaust valve timing. VCT system 232 may be configured to advance or retard valve timing by advancing or retarding cam timing and may be controlled via signal lines by controller 202. VCT system 232 may be configured to vary the timing of valve opening and closing events by varying the relationship between the crankshaft position and the camshaft position. For example, VCT system 232 may be configured to rotate intake camshaft 238 and/or exhaust camshaft 240 independently of the crankshaft to cause the valve timing to be advanced or retarded. In some embodiments, VCT system 232 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 232.

In the depicted example, since the intake valves of all the cylinders 210a-d are actuated by a common intake camshaft, a change in the position of the intake camshaft 238 will affect the intake valve position and timing of all the cylinders. Likewise, since the exhaust valves of all the cylinders 210a-d are actuated by a common exhaust camshaft, a change in the position of the exhaust camshaft 240 will affect the exhaust valve position and timing of all the cylinders. For example, a change in position of the intake and/or exhaust camshaft that advances the (intake or exhaust) valve timing of a first cylinder 210a will also advance the (intake or exhaust) valve timing of the remaining cylinders 210b-d at the same time. As such, by adjusting a valve timing of a cylinder, a torque variation between the cylinders during a given engine cycle may be varied (e.g., increased or decreased). For example, by adjusting the intake camshaft to vary the intake valve timing of the cylinders, torque variations arising due to imbalances in cylinder-to-cylinder air charge may be adjusted. As another example, by adjusting the exhaust camshaft to vary the exhaust valve timing of the cylinders, torque variations arising due to imbalances in cylinder-to-cylinder exhaust residuals may be adjusted. By reducing the torque imbalances arising during engine idling conditions, NVH issues at idling can be reduced.

The inventors herein have recognized that since no two cylinders fire at the same time in a given engine cycle, a camshaft coupled to two or more cylinders may be adjusted during engine idling conditions on a cylinder-by-cylinder (or combustion event-by-combustion event) basis for each combustion event of the two or more cylinders. Thus, a first camshaft adjustment may be performed to move the common camshaft to a first position when a first of the two or more cylinders is firing, and then a second, different camshaft adjustment may be performed to move the common camshaft to a second, different position when a second of the two or more cylinders is firing, and so on for all the cylinders coupled to the common camshaft.

However, not all camshaft adjustments may be possible due to physical limitations of the camshaft. For example, there may be camshaft adjustment limits (e.g., physical limits beyond which a position of the camshaft cannot be further adjusted) that are based on the prevalent engine speed as well as the firing order of the cylinders coupled to the common camshaft that have significant torque variation between them. As elaborated herein with reference to FIG. 3, the controller may allow a camshaft adjustment to be performed if the adjustment is within the adjustment limit. This allows the torque imbalance to be reduced using only adjustments to the common camshaft. However, if the camshaft adjustment required to reduce the imbalance is outside the adjustment limit, the camshaft may be adjusted to a position at the limit and an alternate engine operating parameter may be used to address the remainder of the torque imbalance. For example, an amount of spark retard (or advance) may be used while maintaining the camshaft adjustment at the limit. Herein, the torque balance is reduced using adjustments to the common camshaft as well as adjustments to the spark timing.

As described above, FIG. 2 shows a non-limiting example of an internal combustion engine and associated intake and exhaust systems. It should be understood that in some embodiments, the engine may have more or less combustion cylinders, control valves, throttles, and compression devices, among others. Example engines may have cylinders arranged in a "V" configuration. Further, a first common camshaft may control the valves for a first set of cylinders on a first bank while a second camshaft may control the intake valves for a second set of cylinders on a second bank. That is, a common camshaft of a cam actuation system (e.g., a VCT system) may be used to control valve operation of a group of cylinders.

In this way, the systems of FIGS. 1-2 enable a method for adjusting valve timing of an engine wherein intake and/or exhaust valves of two or more cylinders are operated via a camshaft, and wherein the camshaft is adjusted during engine idle conditions for each combustion event of the two or more cylinders coupled to the common camshaft. By adjusting a position of the camshaft at each combustion event of the cylinders, based on an engine cycle-specific torque variation between the cylinders, engine idling NVH issues may be reduced.

Figure 3:
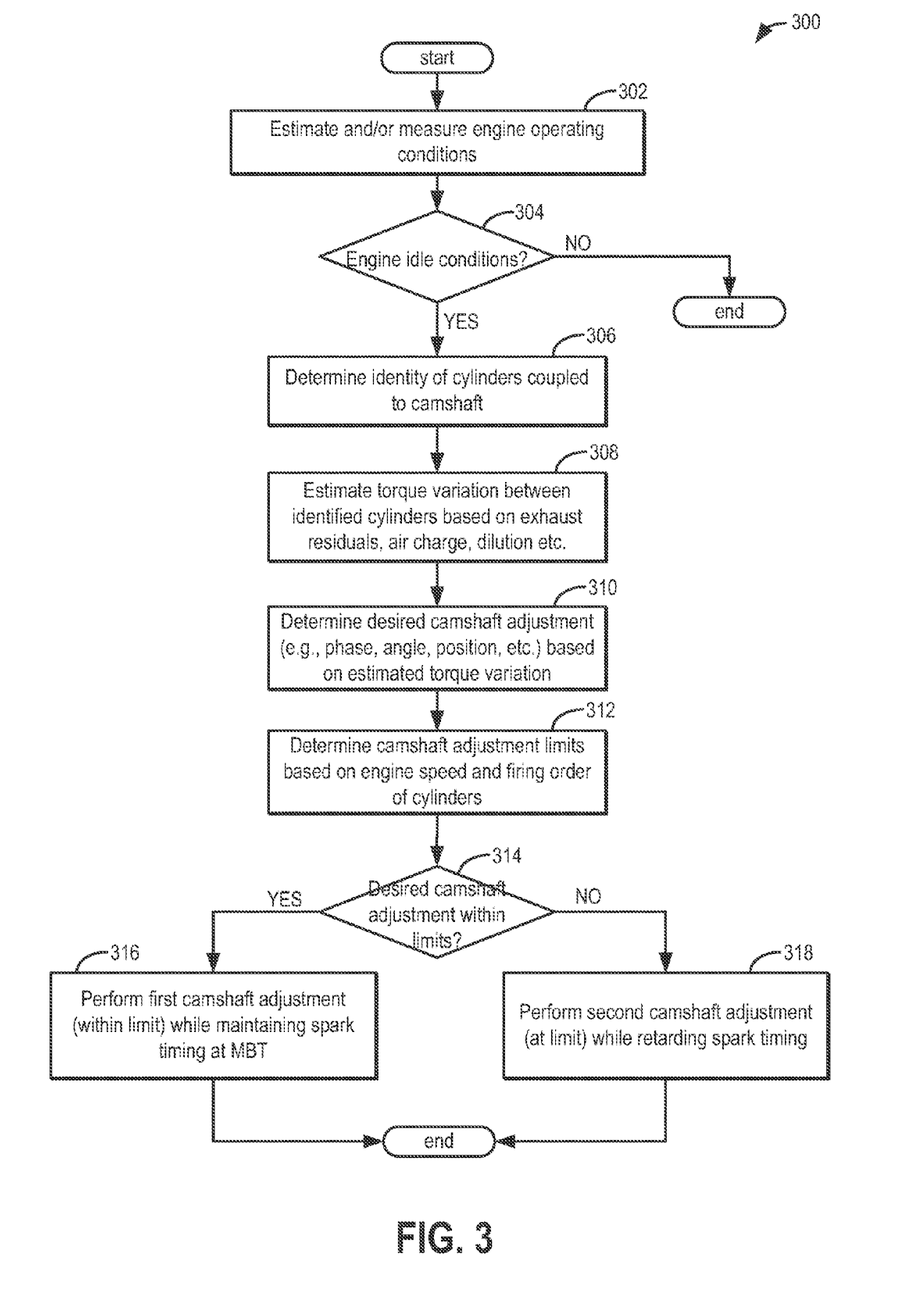
FIG. 3 is a high level flow chart for adjusting a camshaft position during engine idling.
Figure 4A:
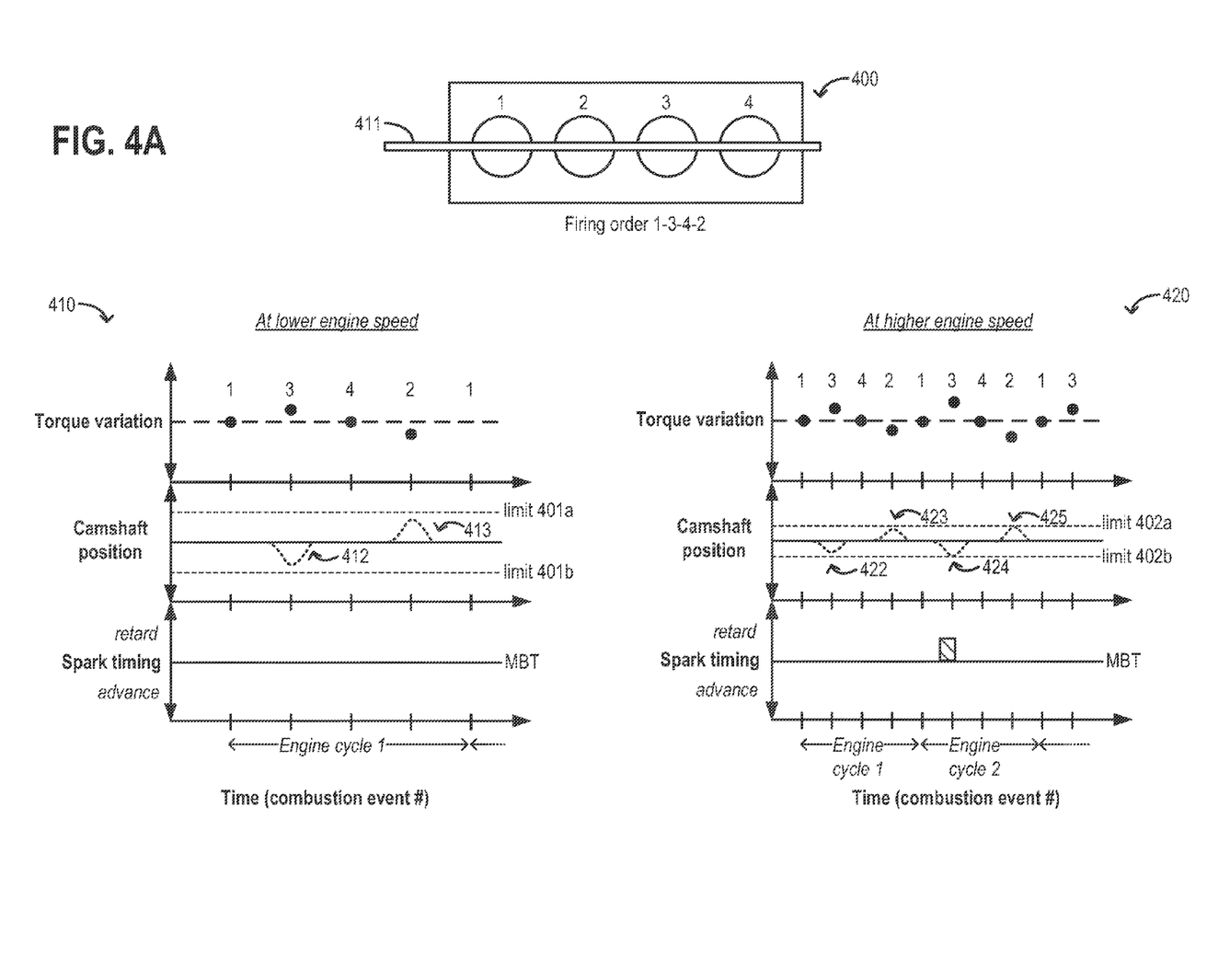
FIGS. 4A-4C show example camshaft position adjustments for reducing cylinder torque variations.
Figure 4B:
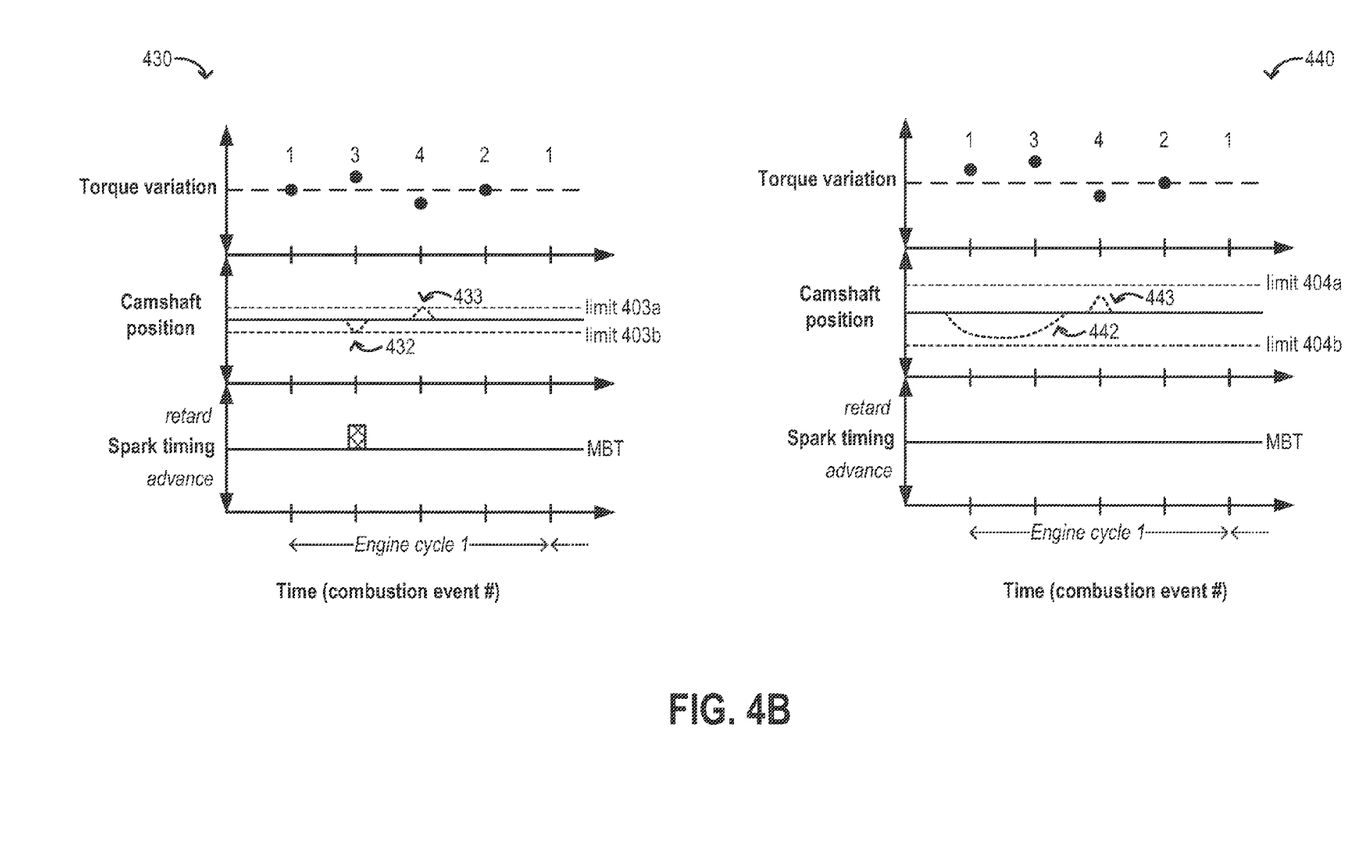
Figure 4C:
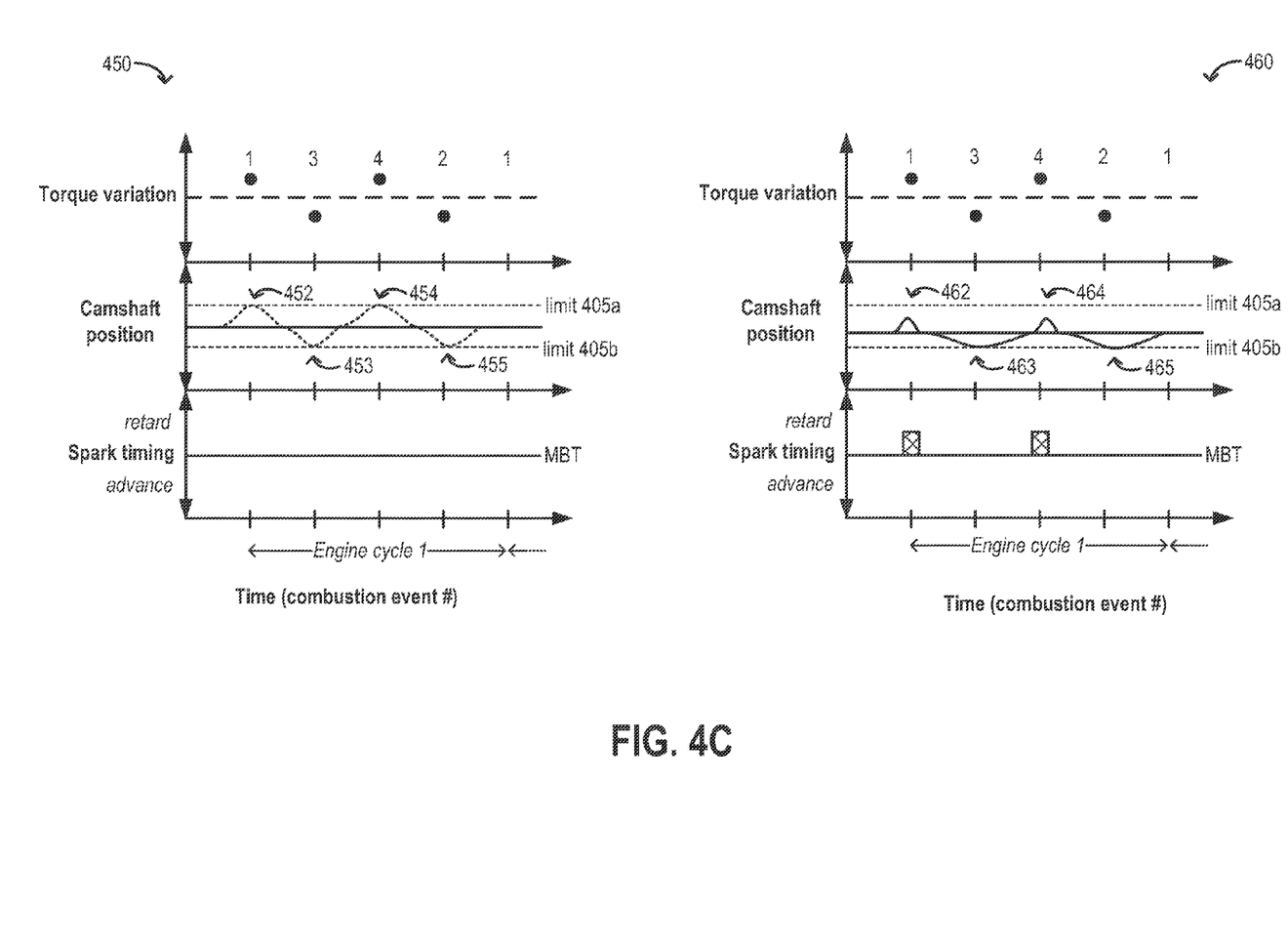

Now turning to FIG. 3, an example method 300 is shown for adjusting a common camshaft coupled to two or more cylinders during engine idling conditions to thereby vary cylinder valve timings and reduce cylinder torque imbalances. In this way, engine idling NVH issues may be reduced.

At 302, engine operating conditions may be estimated and/or measured. These may include, for example, engine speed, torque demand, vehicle speed, ambient conditions, engine temperature, exhaust catalyst temperature, MAP, MAF, etc. At 304, based on the estimated engine operating conditions, an engine idling condition may be confirmed. In one example, an engine idling condition may be confirmed in response to an engine speed being at or below a threshold speed (e.g., an engine idling speed), a torque demand being lower than a threshold, a vehicle speed being lower than a threshold (e.g., a vehicle speed being substantially zero, such as less than 1 mph), and a driver pedal depression being substantially zero (such as, less than 2 degrees). If engine idling conditions are not confirmed, the routine may end.

At 306, the identity of a group of cylinders coupled to a given (common) camshaft may be determined. For example, a cylinder number, firing order, position on the engine block, position on the engine bank, etc., may be determined for each of the two or more cylinders coupled to the given common camshaft. As such, this may be performed for each camshaft in the engine system. In one example, the two or more cylinders coupled to the common camshaft may be located on a common engine bank.

At 308, a torque variation between the two or more cylinders on a given common camshaft may be determined. As such, the torque variation may be determined based on exhaust residuals in the cylinders, air charge imbalances between the cylinders, dilution differences between the cylinders, fueling variations between the cylinders, etc. Various engine data and combustion feedback data may be used to determine the torque variation. These may include, for example, crankshaft acceleration, cylinder pressure, ionization data, camshaft speed, output from one or more accelerometers, etc. In one example, torque variations between the cylinders may be estimated over a defined duration of engine running (e.g., over a defined duration of previous engine idling, such as, a previous engine combustion cycle, or a previous number of warmed-up engine combustion events). The data may be stored as a look-up table in the controller's memory, the data tabulated as a function of the cylinder set coupled to each camshaft. Accordingly, at 308, the controller may retrieve the data from the look-up table in the controller's memory.

At 310, a desired camshaft adjustment may be determined based on the estimated torque variation between the cylinders at engine idling conditions. The camshaft adjustment may enable torque variations and imbalances between the two or more cylinders coupled to a given camshaft to be reduced. As such, adjusting the camshaft may include adjusting one or more of a cam position, a cam timing, and a cam phase of a cam coupled to the camshaft. In particular, by adjusting a position, rotation, angle and/or displacement of the camshaft, corresponding changes may be made at the cams coupled to the camshaft, which in turn affect the opening/closing of the cylinder intake and exhaust valves coupled to the camshaft via the cams.

In one example, where a given common camshaft is coupled to each of a first and a second cylinder, the desired camshaft adjustment may include adjusting the camshaft in a first direction for a (first) combustion event in the first cylinder, and adjusting the camshaft in a second (same or different) direction for a (second) combustion event in a second cylinder. Herein, the combustion events in the first and second cylinders occur during a single engine cycle. As such, in any given engine cycle, each of the engine cylinders may fire once based on their firing order, and the torque imbalances based on which the camshaft adjustment is made may be based on torque imbalances estimated for that given engine cycle, given the other engine operating conditions. For example, in an in-line engine (I-4 engine) with four cylinders numbered 1 through 4, each of the four cylinders may fire once (and only once) in a given engine cycle (e.g., engine cycle 1). Specifically, cylinder 1 may fire, followed by the firing of cylinder 3, then cylinder 4, and finally cylinder 2. Torque imbalances may be estimated between each of cylinders 1-4 during the firing of the cylinders in that engine cycle. Accordingly, camshaft adjustments may be made. At the next firing of cylinder 1, a subsequent engine cycle (that is, engine cycle 2) may be initiated and torque imbalance estimates (and corresponding camshaft adjustments) may be revised.

The desired camshaft adjustment may include adjusting the camshaft to a first position for a combustion event in a first cylinder, and adjusting the camshaft to a second, different position for a combustion event in a second cylinder, the combustion events in the first and second cylinders occurring during a single engine cycle. As previously elaborated, the adjustment may vary valve timings of the first and second cylinder, thereby allowing torque variations between the first and second cylinder to be reduced. The torque variations may be due to imbalances in exhaust residuals, imbalances in air charge, etc. As such, exhaust residuals are a big contributor to idle combustion variability and NVH. In a fixed cam engine, a cam timing may be compromised to trade off performance and idle NVH. However, in variable camshaft systems, such as the system of FIG. 2, a fixed cam timing may be used at engine idle conditions while an alternate camshaft timing is used at high engine loads to give better engine performance. Herein, the camshaft timing may be adaptively changed for each specific combustion event to balance the exhaust residuals and torque output of the various cylinders. That is, the variable camshaft system may be advantageously used to balance torque variations.

In one example, where the adjusting is performed based on the exhaust residual imbalance between the two or more cylinders at each combustion event, adjusting the camshaft may includes adjusting an exhaust valve timing for each combustion event of the two or more cylinders to reduce the exhaust residual imbalance. In another example, where the adjusting is performed based on the air charge imbalance between the two or more cylinders at each combustion event, adjusting the camshaft may include adjusting an intake valve timing for each combustion event of the two or more cylinders.

Next at 312, the routine includes determining camshaft adjustment limits for a given camshaft. The camshaft limits may define translational and rotational limits beyond which the camshaft cannot be moved under the given engine operating conditions. For example, the camshaft limit may be based on the current engine speed. As such, at lower engine speeds, there may be sufficient time between cylinder combustion events for a camshaft adjustment to be performed. However, at higher engine speeds, there may not be sufficient time between combustion events. In addition, the response time of the camshaft may be affected by the engine speed. Thus, the camshaft limit may be decreased as the engine speed increases. As another example, the camshaft limit may be further based on a firing order of the two or more cylinders coupled to the common camshaft. As such, when the two or more cylinders are further apart in firing order, there may be sufficient time between their respective cylinder combustion events for a camshaft adjustment to be performed. However, when the two or more cylinders fire at close firing order (e.g., consecutively), there may not be sufficient time to adjust the camshaft to a desired position. Thus, the camshaft limit may be increased as a difference in firing order (between the affected cylinders) increases.

At 314, the desired camshaft adjustment may be compared to the camshaft limit and it may be determined if the desired camshaft adjustment is within the camshaft limit. If yes, then the torque variation between the cylinders may be reduced using camshaft adjustments only. Accordingly, at 316, during a single engine cycle, when the camshaft adjustment is within the camshaft limit, the controller may perform a first camshaft adjustment that is within the limit while maintaining a spark timing at MBT. For example, the controller may adjust the camshaft to the first position for a combustion event in a first cylinder, and adjust the camshaft to the second, different position for a combustion event in a second cylinder, all the while maintaining spark timing at MBT. In this example, the first and second camshaft positions may be separated by a first, larger amount (e.g., first larger phase, distance, or angle).

If the desired camshaft adjustment is beyond the camshaft limit, the desired camshaft adjustment may not be possible. That is, the torque variation between the cylinders may not be reduced using camshaft adjustments only. Thus, at 318, during a single engine cycle, when the camshaft adjustment is outside the camshaft limit, the controller may perform a second, different camshaft adjustment that is at the limit while adjusting a spark timing from MBT. For example, the controller may adjust the camshaft to a third position for a combustion event in the first cylinder, and adjust the camshaft to a fourth, different position for a combustion event in the second cylinder while retarding the spark timing from MBT. Herein, the third and fourth positions may be separated by a second, smaller amount (e.g., second smaller phase, distance, or angle).

It will be appreciated that, based on the direction of torque imbalance, spark timing may be retarded in only some of the two or more cylinders coupled to the common camshaft. This is because spark retard may be used to decrease cylinder torque output, but not increase cylinder torque output. Thus, spark retard may be advantageously used during the firing of cylinders having torque overshoot (but not the cylinders having torque undershoot) to reduce torque imbalances. It will also be appreciated that while the above examples suggest retarding spark timing from MBT, in alternate examples, such as when the spark timing is already partially retarded or when a likelihood of knock is low, spark timing may be advanced (without incurring cylinder knock) during the combustion event in a cylinder.

As such, the adjustments and the limits may vary based at least on the magnitude of the torque variation between the cylinders, the firing order of the cylinders coupled to the common camshaft, and the engine speed at which the camshaft adjustment is required. As a first example, when adjusting the camshaft to reduce torque variations arising from exhaust residual imbalances, the adjusting may include, during a first condition when the exhaust residual imbalance is smaller than a threshold amount, adjusting the camshaft for each combustion event of the two or more cylinders to reduce the exhaust residual imbalance. Then, during a second condition when the exhaust residual imbalance is larger than the threshold amount, adjusting the camshaft for each combustion event of the two or more cylinders and retarding spark timing to reduce the exhaust residual imbalance. The camshaft adjustment during the second condition may be larger or smaller (in magnitude) than the camshaft adjustment during the first condition.

As another example, when adjusting the camshaft to reduce torque variations arising from air charge imbalances, the adjusting may include, during a first condition when the air charge imbalance is smaller than a threshold amount, adjusting the camshaft for each combustion event of the two or more cylinders to reduce the air charge imbalance. Then, during a second condition when the air charge imbalance is larger than the threshold amount, adjusting the camshaft for each combustion event of the two or more cylinders and retarding spark timing to reduce the air charge imbalance. Herein, the camshaft adjustment during the second condition may be larger or smaller (in magnitude) than the camshaft adjustment during the first condition.

While the above example illustrate adjusting the camshaft responsive to a torque variation between the cylinders that is based on an exhaust residual imbalance and/or an aircharge imbalance, in still other examples, the camshaft adjustment may be responsive to torque disturbances arising from a dilution imbalance, and/or a fueling imbalance between the cylinders coupled to the common camshaft.

As still another example, the adjusting may include, during a first engine speed, and for a given engine torque, adjusting the camshaft to a first position for a first combustion event in a first cylinder and to a second, different, position for second combustion event in a second cylinder, the first and second combustion events occurring within a single engine cycle, the first and second positions separated by a first amount (e.g., a first distance, a first angle, or a first phase). In comparison, during a second, higher engine speed, and for the same engine torque, the adjusting includes adjusting the camshaft to a third position for the first combustion event in the first cylinder and to a fourth position for the combustion event in the second cylinder, the third and fourth positions separated by a second amount (e.g., a second distance, a second angle, or a second phase) that is smaller than the first amount.

In one example, the control routine of FIG. 3 may be implemented in an inner loop and outer loop form wherein in the inner loop, fast response individual cylinder spark timing is adjusted to "fine tune" the control of torque while the outer loop includes phasing of the camshaft for each cylinder event. It will be appreciated that while the routine of FIG. 3 and the examples of FIGS. 4A-4C illustrate compensating for torque imbalances that require camshaft adjustments beyond the camshaft adjustment limit by retarding a spark timing, in alternate examples, one or more other engine operating parameters may be adjusted. For example, the remaining torque imbalance may be adjusted using EGR adjustments (e.g., via adjustments to an EGR valve), and PCV adjustments (e.g., via adjustments to a PCV valve). As one example, EGR trim or PCV adjustments may be used in an adaptive or outer loop fashion where the relatively slow response of the EGR or the inducted air dynamics will not adversely affect the combustion stability.

In this way, during engine idle conditions, a camshaft position may be adjusted during each combustion event of a first and second cylinder coupled to a common camshaft, the adjusting based on an engine cycle-specific torque variation between the first and second cylinder, an intake and/or exhaust valve of the first and second cylinder operated via the common camshaft.

It will be appreciated that while the routine of FIG. 3 and the example adjustments described above are illustrated with reference to engine idling conditions, in further embodiments, similar camshaft adjustments may also be used at selected non-idle engine operating conditions, such as low speed and light load engine operating conditions when under heavy EGR. Therein, if certain cylinders hit their combustion stability limits earlier than others due to imbalance of exhaust residuals, it may be possible to extend a global, external EGR schedule by using cylinder-specific adjustments on a combustion event-by-combustion event basis to tune individual cylinders. For example, the controller may adjust engine valve operation by adjusting a camshaft position during each combustion event of a first and second cylinder coupled to a camshaft, the adjusting based on an engine cycle-specific torque variation between the first and second cylinder, an intake and/or exhaust valve of the first and second cylinder operated via the camshaft, the adjusting carried out during selected engine non-idle conditions.

Example camshaft adjustments based on variations in engine speed, firing order, magnitude of torque variation, as well as differing camshaft limits are now elaborated with reference to FIGS. 4A-4C. The example adjustments of FIGS. 4A-4C are explained with reference to the arrangement of cylinders in engine 400 (at FIG. 4A). Engine 400 is depicted as an inline engine with four cylinders numbered 1 through 4 (that is, an I-4 configuration engine). In the depicted example, the cylinders fire with a firing order of 1-3-4-2. That is, during a single engine cycle (e.g., engine cycle 1), cylinder 1 is the first cylinder to fire, followed by cylinder 3, then cylinder 4, and finally cylinder 2. At the subsequent firing of cylinder 1, a subsequent engine cycle (e.g., engine cycle 2) is initiated. Further, in this example, each of the cylinders 1-4 are coupled to common camshaft 411. Thus, by adjusting a position of camshaft 411, an opening/closing of the intake and/or exhaust valves of each of the cylinders 1-4 may be affected.

Example camshaft adjustments during engine idle conditions are shown at each of maps 410, 420 (FIG. 4A), 430, 440 (FIG. 4B), and 450, 460 (FIG. 4C). In each map, a first plot (top most plot) depicts the torque variation between the cylinders as they fire in the given firing order over an engine cycle. The variation is shown with reference to a baseline (dashed line) depicting an average torque. Thus, a point above the baseline indicates a variation in one direction (e.g., positive variation or torque overshoot) while a point below the baseline indicates a variation in the other direction (e.g., a negative variation or torque undershoot). Each map further includes a second plot (middle plot) depicting a camshaft position with reference to a default position (solid line). Thus, a change in position to above the reference line indicates a camshaft adjustment in one direction while a change in position to below the reference line indicates a camshaft adjustment in the other (e.g., opposite) direction. Finally, each map also includes a third plot (bottom most plot) depicting a spark timing with reference to MBT (solid line). Thus, a change in spark timing to above the MBT line indicates a spark advance while a change in spark timing to below the MBT line indicates a spark retard. It will be appreciated that all plots are depicted over time (along the x-axis), the time represented herein as combustion event numbers (and engine cycles).

A first example camshaft adjustment at a lower engine speed is shown at map 410. During engine idle conditions, a torque variation between the cylinders is determined. Herein, during the depicted engine cycle (engine cycle 1), a torque imbalance is determined between cylinders 3 and 2 which have a difference in firing order of two (cylinder 3 being the second cylinder to fire in the engine cycle while cylinder 2 is the fourth cylinder to fire in the engine cycle). At each engine cycle and for a given engine torque output, the controller may perform a camshaft adjustment to reduce the torque imbalances. In particular, during engine cycle 1, the camshaft may be shifted to a first position 412 at a combustion event of cylinder 3 and then to a second, different position 413 at a combustion event of cylinder 2 to reduce the torque variations between cylinders 3 and 2 and bring the torque output of each towards the average torque/baseline. The first and second camshaft positions 412 and 413 are based on each of the current (lower) engine speed, the difference in firing order between cylinders 3 and 2, and the estimated torque variation. In the depicted example, the determined camshaft adjustment is within camshaft adjustment limits 401a-401b. Thus, while the camshaft is shifted to positions 402 and 403, the spark timing may be maintained at MBT. In this way, during engine idle conditions, a position of a common camshaft may be adjusted at each combustion event of each cylinder coupled to the camshaft based on an engine cycle-specific torque variation between the cylinders.

A second example camshaft adjustment to reduce torque variations between the same set of cylinders but at a higher engine speed is shown at map 420. As such, as an engine speed increases, an amount of time available between consecutive cylinder combustion events may be reduced. Due to the higher engine speed, the camshaft adjustment limits are decreased to limits 402a-402b (which are lower than limits 401a-401b). Herein, while the engine is idling, and during the first engine cycle (engine cycle 1), a torque variation between the cylinders is determined and a first torque imbalance is determined between cylinders 3 and 2. The controller may perform a camshaft adjustment to reduce the torque imbalances. In particular, during engine cycle 1, the camshaft may be shifted to a first position 422 at a combustion event of cylinder 3 and then to a second, different position 423 at a combustion event of cylinder 2 to reduce the torque variations between cylinders 3 and 2 and bring the torque output of each towards the average torque/baseline. The first and second camshaft positions 402 and 403 are based on each of the current (higher) engine speed, the difference in firing order between cylinders 3 and 2, and the estimated torque variation. In addition, since the camshaft positions are within limits 402a-42b, while the camshaft is shifted to positions 422 and 423, the spark timing may be maintained at MBT.

However, in the next engine cycle (engine cycle 2), a torque imbalance between cylinder 3 and 2 may increase. Herein, due to the increased torque imbalance, a camshaft adjustment that is beyond limits 402a-402b may be required. Thus, to reduce the torque variations, a camshaft adjustment is performed to bring the camshaft to a position at the limits while adjusting a spark timing of the cylinders to compensate for the remainder of the torque imbalance. In the specific example, the camshaft may be shifted to a first position 424 at a combustion event of cylinder 3 while retarding spark and then to a second, different position 425 at a combustion event of cylinder 2 while maintaining spark at MBT to reduce the torque variations between cylinders 3 and 2 and bring the torque output of each towards the average torque/baseline. As such, since spark retard enables torque to be decreased, the spark retard is used during the firing of the cylinder having torque overshoot only (that is, cylinder 3 only). In the example of map 420, a distance between the camshaft positions decreases as the engine speed increases.

In this way, as can be seen by comparing maps 410 and 420, during a first engine speed, and for a given engine torque, the camshaft is adjusted to a first position (412) for a first combustion event in a first cylinder (cylinder 3) and to a second, different, position (413) for a second combustion event in a second cylinder (cylinder 2), the first and second combustion events occurring within a single engine cycle (engine cycle 1), the first and second positions separated by a first amount (e.g., a first distance, a first angle, or a first phase). In comparison, during a second, higher engine speed, and for the same engine torque, the camshaft is adjusted to a third position (422, 424) for the first combustion event in the first cylinder (cylinder 3) and to a fourth, different position (423, 425) for the combustion event in the second cylinder, the third and fourth positions separated by a second amount (e.g., a second distance, a second angle, or a second phase) that is smaller than the first amount.

A third example camshaft adjustment for reducing torque variations between a different set of cylinders at the lower engine speed is shown at map 430. Herein, during the depicted engine cycle (engine cycle 1), a torque imbalance is determined between cylinders 3 and 4 which have a difference in firing order of one (cylinder 3 being the second cylinder to fire in the engine cycle while cylinder 4 is the third cylinder to fire in the engine cycle). That is, the cylinders with the most torque imbalance are consecutive in firing order. At each engine cycle and for a given engine torque output, the controller may perform a camshaft adjustment to reduce the torque imbalances. As such, as a difference in firing order between the cylinders coupled to the common camshaft decreases, an amount of time available to shift camshaft positions between the consecutive cylinder combustion events reduces. Thus, due to the smaller difference in firing order, the camshaft adjustment limits are decreased to limits 403a-403b (which are lower than limits 401a-401b of map 410). Due to the proximity in firing order between the cylinders, a camshaft adjustment that is beyond limits 403a-403b may be required to reduce the torque imbalance. Thus, to reduce the torque variations, a camshaft adjustment is performed to bring the camshaft to a position at the limits 403a-403b while adjusting a spark timing of the cylinders to compensate for the remainder of the torque imbalance. In the specific example, the camshaft may be shifted to a first position 432 at a combustion event of cylinder 3 while retarding spark and then to a second, different position 434 at a combustion event of cylinder 4 while maintaining spark at MBT to reduce the torque variations between cylinders 3 and 4 and bring the torque output of each towards the average torque/baseline. Herein, as with the example of map 420, spark retard is used during the firing of the cylinder having torque overshoot only (that is, cylinder 3 only).

In this way, as can be seen by comparing maps 410 and 430, the camshaft adjustment may be further based on a firing order of the cylinders having the torque imbalance. In particular, when a firing order difference between a first and second cylinder coupled to the common camshaft is higher, spark timing can be maintained at MBT while the camshaft position can be adjusted based on the torque variation until a first camshaft limit is reached. Then, after the first camshaft limit is reached, the camshaft position can be maintained at a first camshaft position and spark timing can be retarded based on the torque variation. In comparison, when the firing order difference between the first and second cylinder is lower, spark timing can be maintained at MBT while adjusting the camshaft position based on the torque variation until a second, lower camshaft limit is reached. Then, after the second camshaft limit is reached, the camshaft may be maintained a second, different camshaft position and spark timing can be retarded based on the torque variation. Herein, the first and second camshaft limits are based on the firing order difference between the first and second cylinder.

A fourth example camshaft adjustment for reducing torque variations between an alternate set of cylinders at the lower engine speed is shown at map 440. Herein, during the depicted engine cycle (engine cycle 1), a torque imbalance is determined between cylinders 1, 3 and 4 with a torque imbalance of cylinder 1 and 3 having the same directionality while the torque imbalance of cylinder 4 has an opposite directionality. In addition, cylinders 1 and 4 may have a larger difference in firing order while cylinders 3 and 4 have a smaller difference in firing order (cylinder 1 being the first cylinder to fire in the engine cycle, cylinder 3 being the second cylinder to fire in the engine cycle and cylinder 4 being the third cylinder to fire in the engine cycle). Accordingly, camshaft limits 404a-404b may be determined. Herein, due to the common directionality of torque imbalance between cylinders 1 and 3 (both cylinders show torque overshoot), a common camshaft adjustment that is within limits 404a-404b may be determined for each of cylinders 1 and 3, while a different camshaft adjustment is determined for cylinder 4. In the specific example, the camshaft may be shifted to a first position 442 at a combustion event of cylinder 1 and maintained at that position for the combustion event of cylinder 3, all the while maintaining spark timing at MBT. Then, the camshaft may be shifted to a second, different position 444 at a combustion event of cylinder 4 while also maintaining spark timing at MBT to reduce the torque variations between cylinders 1, 3 and 4 and bring the torque output of each towards the average torque/baseline. In alternate examples, based on the magnitude and directionality of torque imbalance, as well as the engine speed, the camshaft adjustment required may be more than the camshaft limits 404a-404b. If so, the camshaft may be shifted to a position at the limit while retarding spark timing to compensate for the remaining torque imbalance.

It will be appreciated that while the example illustrate imbalances between two or three of the four cylinders coupled to a common camshaft, in alternate examples, a larger or smaller number of cylinder may be coupled to the common camshaft and one or more (e.g., all) of the cylinders may have torque imbalances. In each case, based on the torque imbalance, the engine speed, and the firing order of the affected cylinders, a camshaft adjustment and position may be selected.

Now turning to FIG. 4C, a fifth and sixth example camshaft adjustment for reducing torque variations is shown at maps 450 and 460. In both cases, during the depicted engine cycle (engine cycle 1), a torque imbalance is determined for each of the cylinders 1-4, with consecutively firing cylinders having opposite directionality of torque imbalance. Specifically, the first and third cylinders to fire (cylinders 1 and 4) have torque overshoot while the second and fourth cylinders to fire (cylinders 3 and 2) have torque undershoot. Based on the prevalent engine speed conditions, the magnitude of the torque imbalance, and the firing order of the cylinders, camshaft limits 405a-405b may be determined. Map 450 depicts an example symmetric camshaft adjustment that may be used to address the torque imbalance while map 460 depicts an example asymmetric camshaft adjustment that may be used to address the same torque imbalance.

Specifically, at map 450, to reduce torque overshoot during the firing of cylinders 1 and 4, and bring the torque output of each towards the average torque/baseline, the camshaft may be shifted to positions 452 and 454, respectively. Likewise, to reduce torque undershoot during the firing of cylinders 3 and 2, and bring the torque output of each towards the average torque/baseline, the camshaft may be shifted to positions 453 and 455, respectively. All the while, spark timing may be maintained at MBT. Optionally, spark timing may be retarded during the firing of cylinders 1 and 4 to address the torque overshoot.

In some examples, based on the magnitude of the torque imbalance, the combination of symmetric camshaft adjustment and spark retard may be sufficient to address the torque imbalance. However, in alternate examples, the camshaft adjustment (and optionally spark retard) may sufficiently address the torque overshoot of cylinders 1 and 4 (e.g., bring it to the average torque/baseline), but the camshaft adjustment may not sufficiently address the torque undershoot of cylinders 2 and 3 (e.g., there may still be some residual undershoot). As a result, some torque imbalance may persist. That is, the positioning of the camshaft at positions 452 and 454 may decrease the torque overshoot of cylinders 1 and 4 to the baseline, but the positioning of the camshaft at positions 453 and 455 may not be sufficient to raise the torque undershoot of cylinders 3 and 2 up to the baseline.

Map 460 shows an alternate example wherein the torque imbalance is better reduced using asymmetric camshaft adjustments. Specifically, a larger camshaft adjustment is performed for the cylinders that have torque undershoot to balance their torque (or even overshoot by a small amount). At the same time, a smaller camshaft adjustment is performed for the cylinders that have torque overshoot and the smaller camshaft adjustment is combined with an amount of spark retard in those cylinders to balance their torque (or even undershoot by the same small amount). Herein, the higher accuracy and control of spark retard in decreasing torque is advantageously used to offset the torque imbalance.

As shown at map 460, to decrease the torque overshoot during the firing of cylinders 1 and 4, the camshaft may be shifted by a smaller amount to positions 462 and 464, respectively. At the same time, spark may be retarded from MBT by an amount. The combination of the camshaft adjustment (to positions 462, 464) and the spark retard may decrease the torque imbalance of cylinders 1 and 4 and bring the torque output of each towards the average torque/baseline, or even lead to a small amount of torque undershoot. Likewise, to reduce the torque difference between the torque undershoot during the firing of cylinders 3 and 2 and bring their torque output to the baseline, the camshaft may be shifted by a larger amount to positions 463 and 465, respectively. All the while, spark timing may be maintained at MBT. Herein, the camshaft adjustment (to positions 463, 465) may increase the torque imbalance of cylinders 2 and 3 and bring the torque output of each towards the average torque/baseline, or even lead to a small amount of torque overshoot which is compensated over the given engine cycle by the torque overshoot generated during the firing of cylinders 1 and 4. That is, by using a larger camshaft adjustment and spark retard (from MBT) in cylinders with torque overshoot, while using a smaller camshaft adjustment and spark maintenance (at MBT) in cylinders with torque undershoot, cylinder-to-cylinder torque variations may be better balanced over a given engine cycle.

In this way, an engine controller may be configured to operating intake and/or exhaust valves of two or more cylinders via a camshaft and within a single engine cycle (e.g., a first engine cycle) advance the camshaft for a first combustion event to increase torque toward an average torque with spark timing at MBT, and retard the camshaft and spark timing for a second combustion event to decrease torque toward the average torque. The controller may then repeat the same adjustment for a next single engine cycle (e.g., a second engine cycle immediately following the first engine cycle).

It will be appreciated that while the examples of FIGS. 4A-4C illustrate compensating for torque imbalances that require camshaft adjustments beyond the camshaft adjustment limit by retarding spark timing, in alternate examples, one or more other engine operating parameters may be adjusted. For example, the remaining torque imbalance may be adjusted using EGR adjustments (e.g., via adjustments to an EGR valve), and PCV adjustments (e.g., via adjustments to a PCV valve) in an adaptive or outer loop where slow response of EGR or induced air dynamics do not affect the combustion stability.

In this way, a common camshaft coupled to two or more cylinders may be adjusted during engine idling conditions to adaptively tune the camshaft position (and thereby the corresponding cam position) for each cylinder's combustion event. In particular, a position of the common camshaft can be adjusted at each combustion event of cylinders coupled to the camshaft based on an engine cycle-specific torque variation between the cylinders. By appropriately phasing the timing for each cylinder's intake and exhaust valve event, an amount of residuals in the cylinders may be adaptively controlled to reduce residual imbalances. By adjusting the camshaft in a cylinder specific manner during each cylinder's combustion event, a common actuator may be advantageously used to reduce torque imbalances with reduced use of spark retard. By reducing the need for spark retard to address torque imbalances, fuel economy may be improved. By reducing torque variations between the cylinders during idling, engine idle NVH issues may be reduced and engine performance may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for adjusting valve timing of an engine, comprising:
   compressing intake air with a compression device, an amount of compression provided to one or more cylinders of the engine varied by a controller;
   operating intake valves of two or more cylinders via a camshaft; and
   adjusting, with the controller, the camshaft based on a camshaft limit during engine idle conditions for each combustion event of the two or more cylinders via a hydraulically operated actuator.

2. The method of claim 1, wherein the adjusting includes adjusting the camshaft to a first position for a combustion event in a first cylinder, and adjusting the camshaft to a second, different position for a combustion event in a second cylinder, the combustion events in the first and second cylinders occurring during a single engine cycle.

3. The method of claim 1, wherein the adjusting includes adjusting the camshaft in a first direction for a combustion event in a first cylinder, and adjusting the camshaft in a second direction for a combustion event in a second cylinder, the combustion events in the first and second cylinders occurring during a single engine cycle.

4. The method of claim 2, wherein adjusting the camshaft includes adjusting one or more of a cam position, a cam timing, and a cam phase of a cam coupled to the camshaft, and where the intake valves of the two or more cylinders are adjusted to different timings via adjusting the camshaft in a same single engine cycle.

5. The method of claim 1, wherein the adjusting includes,
   during a first engine speed, and for a given engine torque, adjusting the camshaft to a first position for a first combustion event in a first cylinder and to a second, different, position for a second combustion event in a second cylinder, the first and second combustion events occurring within a single engine cycle, the first and second positions separated by a first amount; and
   during a second, higher engine speed, and for the given engine torque, adjusting the camshaft to a third position for the first combustion event in the first cylinder and to a fourth position for the second combustion event in the second cylinder, the third and fourth positions separated by a second amount smaller than the first amount.

6. The method of claim 1, where adjusting the camshaft includes,
   during a single engine cycle,
      when a camshaft adjustment is within the camshaft limit, adjusting the camshaft to a first position for a combustion event in a first cylinder, and adjusting the camshaft to a second, different position for a combustion event in a second cylinder while maintaining a spark timing at MBT, the first and second positions separated by a first, larger distance; and
      when the camshaft adjustment is outside the camshaft limit, adjusting the camshaft to a third position for a combustion event in the first cylinder, and adjusting the camshaft to a fourth, different position for a combustion event in the second cylinder while retarding the spark timing, the third and fourth positions separated by a second, smaller distance.

7. The method of claim 6, wherein the camshaft limit is based on an engine speed, the camshaft limit decreased as the engine speed increases.

8. The method of claim 6, wherein the camshaft limit is further based on a firing order of the two or more cylinders, the camshaft limit increased as a difference in firing order increases.

9. The method of claim 1, wherein the adjusting is based on an exhaust residual imbalance between the two or more cylinders at each combustion event.

10. The method of claim 9, wherein adjusting based on the exhaust residual imbalance includes,
    during a first condition when the exhaust residual imbalance is smaller than a threshold amount, adjusting the camshaft for each combustion event of the two or more cylinders to reduce the exhaust residual imbalance while maintaining spark timing at MBT; and
    during a second condition when the exhaust residual imbalance is larger than the threshold amount, adjusting the camshaft for each combustion event of the two or more cylinders and retarding spark timing from MBT to reduce the exhaust residual imbalance.

11. The method of claim 1, wherein the adjusting is based on an air charge imbalance between the two or more cylinders at each combustion event.

12. The method of claim 11, wherein the adjusting based on the air charge imbalance includes,
    during a first condition when the air charge imbalance is smaller than a threshold amount, adjusting the camshaft for each combustion event of the two or more cylinders to reduce the air charge imbalance while maintaining spark timing at MBT; and
    during a second condition when the air charge imbalance is larger than the threshold amount, adjusting the camshaft for each combustion event of the two or more cylinders and retarding spark timing from MBT to reduce the air charge imbalance.

13. The method of claim 1, wherein the two or more cylinders are located on a common engine bank.

14. The method of claim 1, wherein adjusting the camshaft includes adjusting a position of the camshaft via cam phase adjustments.

15. A method for an engine, comprising:
    during engine idle conditions,
       adjusting a camshaft position of an electrically actuated cam phaser during each combustion event of a first cylinder and a second cylinder coupled to a camshaft, the adjusting based on an engine cycle-specific torque variation between the first and second cylinders, an intake valve of the first and second cylinders operated via the camshaft.

16. The method of claim 15, wherein the adjusting based on the torque variation between the cylinders includes adjusting based on an exhaust residual imbalance between the first and second cylinders.

17. The method of claim 15, wherein the adjusting based on the torque variation between the cylinders includes adjusting based on a fueling imbalance between the first and second cylinders.

18. The method of claim 15, wherein the adjusting based on the torque variation between the cylinders includes adjusting based on an aircharge imbalance between the first and second cylinders.

19. An engine system, comprising:
a direct injection engine including a first cylinder and a second cylinder;
a turbocharger coupled to the engine;
a camshaft coupled to the first and second cylinders, the camshaft actuated to operate an intake valve of the first and second cylinders; and
a controller with computer readable instructions for,
  during engine idle conditions,
    estimating a torque variation between the first and second cylinders; and
    at each engine cycle and for a given engine torque output, adjusting the camshaft to a first position at a first combustion event of the first cylinder and to a second, different position at a second combustion event of the second cylinder to reduce the torque variation, the first and second positions based on each of an engine speed, a firing order of the first and second cylinders, a camshaft limit, and the estimated torque variation.

* * * * *